(12) United States Patent
Xu

(10) Patent No.: US 7,483,635 B2
(45) Date of Patent: Jan. 27, 2009

(54) MULTI-WAVELENGTH PULSE GENERATOR USING TIME-LENS COMPRESSION

(75) Inventor: Chris Xu, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 600 days.

(21) Appl. No.: 11/125,324

(22) Filed: May 10, 2005

(65) Prior Publication Data

US 2006/0018668 A1    Jan. 26, 2006

Related U.S. Application Data

(60) Provisional application No. 60/569,269, filed on May 10, 2004.

(51) Int. Cl.
*H04J 14/02* (2006.01)
(52) U.S. Cl. .................. 398/81; 398/91; 398/185; 398/195
(58) Field of Classification Search ............. 398/81, 398/91, 188–189, 185, 195
See application file for complete search history.

(56) References Cited

U.S. PATENT DOCUMENTS 5,953,139 A * 9/1999 Nemecek et al. ............. 398/79
6,606,178 B1 * 8/2003 Rhee et al. .................. 398/188

OTHER PUBLICATIONS

J. U. Kang and R. D. Esman "Demonstration of Time Interweaved Photonic Four-Channel WDM Sampler for Hydrid Analogue-Digital Converter," Electronics Letters, (vol. 35), (No. 1), (p. 60-61), (Jan. 7, 1999).
Brain H. Kolner, "IEEE Journal of Quantum Electronics, " Space-Time Duality and the Theory of Temporal Imaging, (vol. 30), (No. 8), (p. 1951-1963), (Aug., 1994).
Asif A. Godil et al., "Picosecond Time-Lenses, " IEEE Journal of Quantum Electronics, (vol. 30), (No. 3), (p. 827-837), (Mar., 1994).
Cory V. Bennett and Brian H. Kolner, "Aberrations in Temporal Imaging, " IEEE Journal of Quantum Electronics, (vol. 31), (No. 1), (p. 20-32), (Jan., 2001).

* cited by examiner

*Primary Examiner*—Leslie Pascal
(74) *Attorney, Agent, or Firm*—Jones, Tullar & Cooper, P.C.

(57) ABSTRACT

A method and apparatus for generating a multi-wavelength pulse train use a technique referred to as time-lens compression. The time-lens is formed of a phase modulator in series with a dispersion element. In addition to pulse compression, this time-lens simultaneously displaces the pulses according to their center wavelengths, resulting in a temporally evenly spaced multi-wavelength pulse train. An aberration correction technique, based on the temporal analog of a spatial correction lens, can also be employed improve the quality of the compressed pulses. Through use of CW DFB lasers and electrooptic phase modulators, the all-fiber system allows complete tunability of temporal spacing, spectral profile and repetition rate.

19 Claims, 3 Drawing Sheets

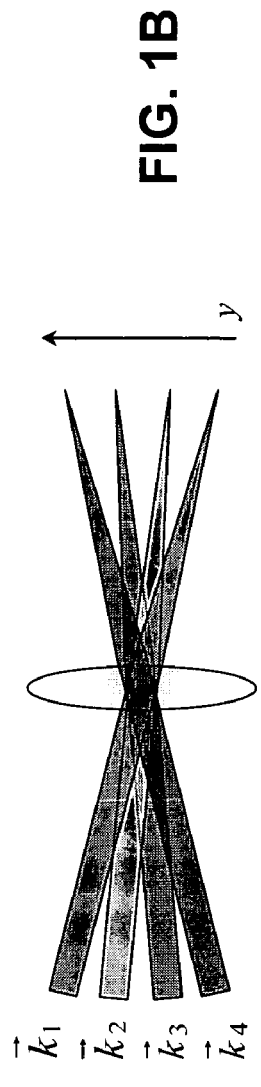
FIG. 1B
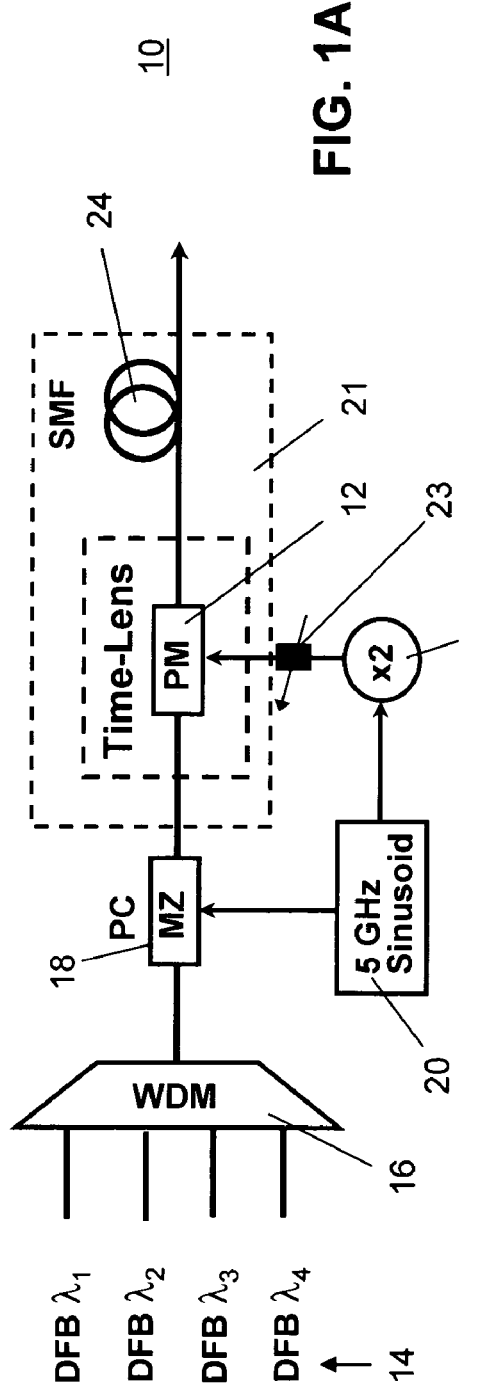
FIG. 1A
FIG. 1D
FIG. 1C

MULTI-WAVELENGTH PULSE GENERATOR USING TIME-LENS COMPRESSION

CROSS REFERENCE TO RELATED APPLICATIONS

This application claims the benefit, under 35 U.S.C. 119 (e), of U.S. Provisional Application No. 60/569,269, filed May 10, 2004, which is herby incorporated by reference.

BACKGROUND OF THE INVENTION

1. Field of the Invention

The present invention relates in general to a method and apparatus for generating an optical pulse train formed of evenly spaced pulses of multiple wavelengths using a technique referred to as time-lens compression. In addition, the invention relates to an aberration correction technique, based on the temporal analog of a spatial correction lens, to improve the quality of the compressed pulses.

2. Description of the Background Art

Optical wavelength division multiplexing (WDM) parallel processing has shown great promise for ultrafast real-time sampling. However, the complexity of the sampling source, which requires a linear time-to-wavelength mapping, hampers its practical implementation. Previous approaches to obtain such a "linearly chirped" multi-wavelength source, i.e. a source that generates a periodically repeating multi-wavelength pulse train with very precise interpulse spacing, relied on complex femtosecond modelocked lasers to provide the necessary spectral bandwidth and required spectral slicing, spectral flattening and adjustable time delay.

SUMMARY OF THE INVENTION

The present invention provides a system and method for generating a "linearly chirped" multi-wavelength pulse train that eliminates the need for a complex sampling source. Instead, through use of a phase modulator that acts as a "time-lens" in combination with a dispersion element, the present invention is capable of using conventional, independently controlled continuous wave (CW) laser sources to generate a multi-wavelength pulse train having even-spaced compressed pulses. The phase modulator is referred to as a time-lens because of the element's analogous behavior to a spatial lens. A time-lens works by imposing a quadratic phase on an incoming E-field, though in time instead of space. To achieve both pulse compression and displacement of the pulses in accordance with their center wavelengths, the time-lens is placed in series with a dispersion element, such as an optical fiber or a fiber Bragg grating (FBG). This results in a temporally evenly spaced multi-wavelength pulse train. Furthermore, a new aberration correction technique that uses another form of lens can be employed to improve the quality of the compressed pulses.

In the preferred embodiments, a plurality of CW distributed feedback (DFB) lasers is employed where each of the lasers is tuned to a different frequency such that they generate laser beams of slightly different wavelengths from one another. A multiplexed beam comprised of the different wavelengths is then formed by combining the laser outputs in a wavelength division multiplexer (WDM). This multiplexed beam is then fed through a pulse carver, such as a Mach-Zenhder (MZ) modulator, which generates a plurality of temporally overlaying 10 GHz 33% duty cycle pulse trains. The overlaying pulse trains are then temporally compressed and displaced by the time-lens system, which consists of a low-$V_\pi$ phase modulator that is driven synchronously by a sinusoidal drive, and a dispersion element, such as a spool of standard single mode fiber (SSMF). Using a fiber of length Z and dispersion parameter $\beta_2$ to provide the linear dispersion needed for compression, the minimum pulse width is obtained when the output pulse is chirp-free.

Driving the phase modulator at the desired modulation period and voltage determines $Z_{cf}$. This in turn determines the necessary frequency spacing $\Delta v$ for even pulse spacing, which can be easily obtained with the independently controlled CW DFB lasers. The frequencies of the CW DFB lasers are therefore selected such that no spectral overlap occurs after compression by the time-lens system.

In one preferred embodiment, a new approach to eliminating aberration, without significantly sacrificing the compression ratio, is also employed. Instead of restricting the time aperture, a correction lens analogous to aberration-correction in spatial imaging is added to the system. The correction lens consists of another phase modulator, but this time driven with a lower voltage, but at twice the frequency of the time-lens phase modulator. Fourier analysis allows any periodic function to be decomposed into a sum of harmonics. The correction lens essentially adds the next harmonic in the Fourier decomposition of a quadratic.

BRIEF DESCRIPTION OF THE DRAWINGS

The various features and advantages of the invention will become apparent to those of skill in the art from the following description, taken with the accompanying drawings, in which:

FIG. 1A is a schematic illustration of a first preferred embodiment of the present invention comprising a system for generating an optical pulse train formed of evenly spaced pulses of multiple wavelengths;

FIG. 1B is a graphical depiction of a spatial lens analogy to the time-lens employed in the preferred embodiments;

FIG. 1C is a graphical depiction of an input waveform to the time-lens system of the first preferred embodiment;

FIG. 1D is a graphical depiction of an output pulse train that is generated by the first preferred embodiment;

DETAILED DESCRIPTION OF THE PREFERRED EMBODIMENTS

Figure 2:
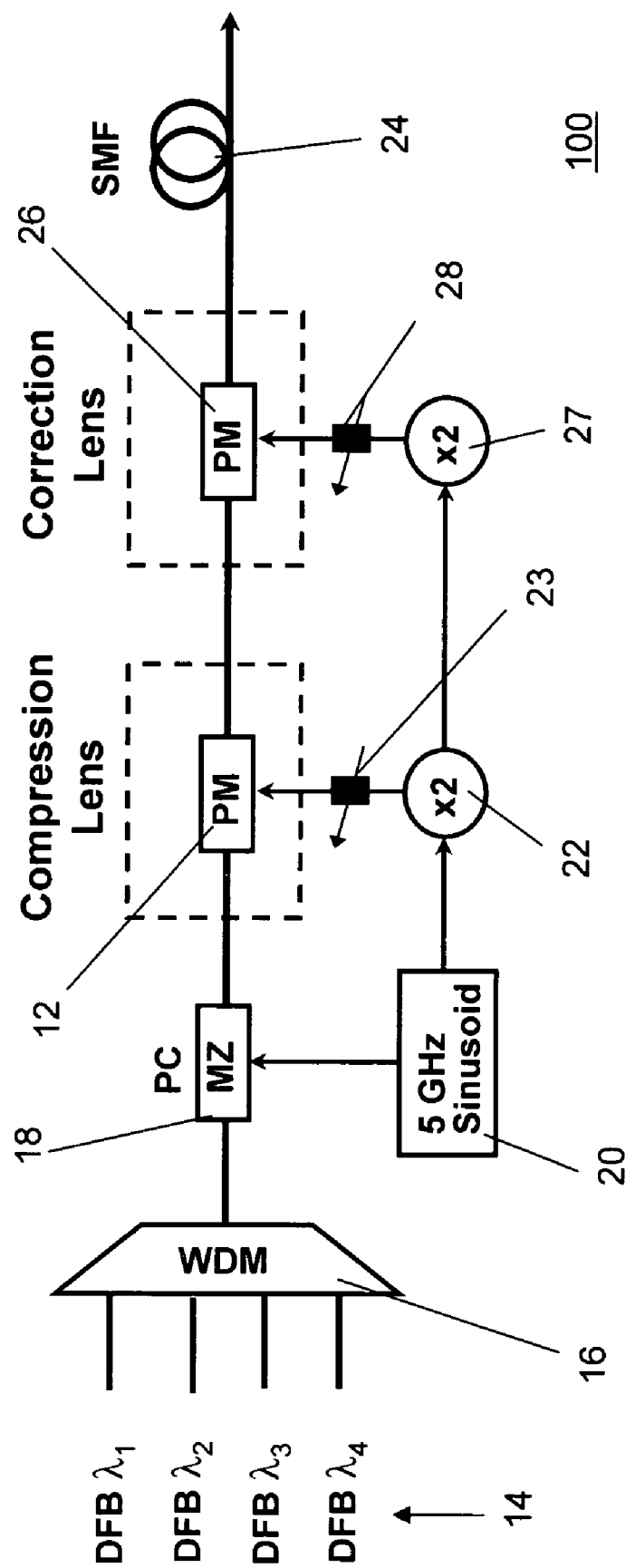
FIG. 2 is a schematic illustration of a second preferred embodiment of the invention comprising the system of FIG. 1A modified to provide aberration correction.

Turning now to a more detailed consideration of a number of preferred embodiments of the invention, FIG. 1A illustrates a first preferred embodiment comprising a pulse generating system 10 for generating a "linearly chirped" multi-wavelength pulse train. In addition to pulse compression, this time-lens simultaneously displaces pulses in a pulse train according to their center wavelengths, thereby resulting in a temporally evenly spaced multi-wavelength pulse train.

The most significant element of the system 10 is a time-lens 12 that is implemented by a phase modulator. Before considering the other elements of the system 10 further, the theory of operation of the time-lens 12 will be discussed. A time-lens, in analogy to a spatial lens as graphically illustrated in FIG. 1B, works by imposing a quadratic phase on an incoming E-field, though in time instead of space. For a single period and wavelength, a Gausssian E-field is assumed:

$$E = E_o \exp\left(\frac{-t^2}{2T_o^2}\right), \quad (1)$$

where $T_o$ is the 1/e pulse half-width, and impose a phase, $$\Delta\varphi = \pi \frac{V}{2V_\pi} \cos\left(\frac{2\pi t}{T_m}\right) \approx \frac{-Ct^2}{2T_o^2}, \quad (2)$$

where V is the peak-to-peak drive voltage, $V_\pi$ is the drive required to obtain a $\pi$ phase shift, $T_m$ is the modulation period, and $$C = \frac{2\pi^3 V}{V_\pi} \frac{T_o^2}{T_m^2}.$$

In this analysis, the cosine has been expanded to second order and the constant phase term is neglected.

After phase modulation, the electric field is simply $$E = E_o \exp\left(-\frac{1+iC}{2} \frac{t^2}{T_o^2}\right). \quad (3)$$

Eq. (3) describes a standard linearly chirped Gaussian pulse. If this pulse is then passed through a fiber of length Z and dispersion parameter $\beta_2$ to provide the linear dispersion needed for compression, the minimum pulse width is obtained when the output pulse is chirp-free:

$$Z = Z_{cf} = \frac{C}{1+C^2} L_D, \quad (4)$$

where $$L_D = \left|\frac{T_o^2}{\beta_2}\right|$$

is the dispersion length of the fiber. Fulfilling this condition results in an output pulse width $$T = \frac{T_o}{\sqrt{1+C^2}}. \quad (5)$$

The analysis above for a single wavelength applies to a multi-wavelength system as well, except that a carrier frequency dependent time delay is introduced due to dispersion. Although the $V_\pi$ of a phase modulator depends on the carrier wavelength ($V_\pi \propto \lambda$), the variation of $V_\pi$ is negligible (<1%) in the present invention because of the narrow wavelength span needed. For an N-wavelength system of evenly spaced frequency $\Delta v$, the time delay between adjacent frequency pulses due to dispersion is $$\Delta t = 2\pi\beta_2 Z_{cf} \Delta v \quad (6)$$

The condition for evenly spaced pulses after chirp-free pulse compression can be met if $$\Delta t = T_m\left(\frac{1}{N} + n\right) = 2\pi\beta_2 Z_{cf} \Delta v, \quad (7)$$

where n is an integer number n=0,1,2 . . . For successful WDM parallel processing, adjacent frequency pulses must not overlap spectrally, a condition that can always be satisfied by choosing the appropriate value of n. Eq. (7) denotes the simplicity and flexibility of such a system. Driving the phase modulator(s) at the desired modulation period and voltage determines $Z_{cf}$. This in turn determines the necessary frequency spacing $\Delta v$ for even pulse spacing, which is easily obtained with independently controlled CW DFB lasers, for example.

With detailed reference now to FIG. 1A, the exemplary system 10 is designed to generate pulses of four different wavelengths, though it will of course be understood that any desired number of wavelengths could be employed. Four independent CW DFB lasers 14 are employed, one for each of the four wavelengths $\lambda 1$, $\lambda 2$, $\lambda 3$ and $\lambda 4$. The corresponding frequencies are spaced 835 GHz (≈6.7 nm) apart such that no spectral overlap occurs after compression (n=1 Eq. (7)).

The outputs from the lasers 14 are combined in a wavelength division multiplexer (WDM) 16 which forms a multiplexed beam that includes each of the four laser frequencies. To convert the beam to a pulse train, a Mach-Zenhder (MZ) modulator 18 (such as a JDS Uniphase OC-192) is used as a standard pulse carver (PC), i.e. biased at maximum transmission and driven with the output of a 5 GHz sinusoid drive 20, which generates four temporally overlaying 10 GHz 33% duty cycle pulse trains that appear as in FIG. 1C.

The overlaying pulse trains are temporally compressed and displaced by a time-lens system 21. This consists of the time-lens 12, which is implemented in the preferred embodiments by a low-$V_\pi$ LiNbO$_3$ phase modulator (e.g. Sumitomo T.PMH1.5-11) 12 that is driven synchronously at 9.0 $V_\pi$ by a 10 GHz sinusoidal by multiplying the output frequency of the sinusoid drive 20 by 2 with a frequency multiplier 22 and feeding the drive signal through a variable RF delay 23. This drive signal approximates a parabolic lens function. In addition, the time-lens system 21 includes a dispersion element 24, which in this embodiment is a 1.1 km spool of standard single mode fiber (SSMF) with dispersion of 18.7 ps/nm. It should be noted, however, that the fiber spool can be replaced by other dispersive devices such as a fiber Bragg grating (FBG), making the system even more compact and eliminating the potential problem of slow timing jitter (wander) from temperature fluctuations. The resulting pulse train output appears as in FIG. 1D with compressed, evenly spaced, temporally multiplexed pulses of each of the four wavelengths.

Experiments confirmed a close match between actual measurements and theoretical results that demonstrates the reliability and predictability of the system. The temporal spacing of the multi-wavelength pulses was measured and found to be 25 ps with a small variation of ±0.3 ps. This variation agrees with what is expected due to a non-zero dispersion slope of the SSMF, which can be eliminated by proper dispersion slope compensation. An experimental cross correlation trace showed a remarkable match to theory. Using a deconvolution factor obtained through numerical modeling, a deconvolved pulse width of 2.6 ps and hence a compression ratio of 13 is achieved. This compression is approximately a factor of 2 smaller than that predicted by Eq. (5) (≈22). The discrepancy is due to the approximation of the sinusoidal phase modulation as quadratic. Simply, the quadratic approximation of a cosine-wave is totally invalid beyond the inflection point, where the curvature of the phase modulation changes sign.

A second preferred embodiment is illustrated in FIG. 2. This embodiment comprises a pulse generating system 100 that is basically the same as the system 10 of the first embodiment except that it includes an aberration correction technique to improve the quality of the compressed pulses. Any departure from an ideal quadratic phase in a time-lens system introduces aberrations. Proper imaging relies on the quadratic phase filtering supplied by dispersion, as well as the quadratic phase modulation imposed on the incoming E-field. Higher order dispersive or modulation terms will only distort the image. Aberrations from higher-order dispersion can be neglected in the present invention. Third-order dispersion, for example, is estimated to introduce only a 0.3% delay of the half-max spectral component of a compressed pulse from its ideal location. The leading aberration in the present invention comes from higher order phase modulation terms. This distortion is responsible for side lobes that are visible in an autocorrelation trace of the compressed pulses. The approximation of the cosine phase modulation drive as quadratic is only valid under a small portion of the cusp of the sinusoid. Restricting the temporal object to a time aperture of $$\tau_a \approx \frac{T_m}{2\pi}$$

is suggested to keep the next higher-order term negligible (approximately 2% of the quadratic term). However, there are two penalties associated with such a restriction. First, it is necessary to begin with much shorter pulses. In the present invention, input pulses would need to be less than 16.0 ps. This corresponds to a duty cycle of 16% or less, which is difficult to realize using the pulse carving technique. Second, and perhaps more importantly, restricting the time aperture leads to a much smaller compression ratio. Calculations show that a compression ratio of only 4 can be achieved with a 16.0 ps input pulse.

Figure 3:
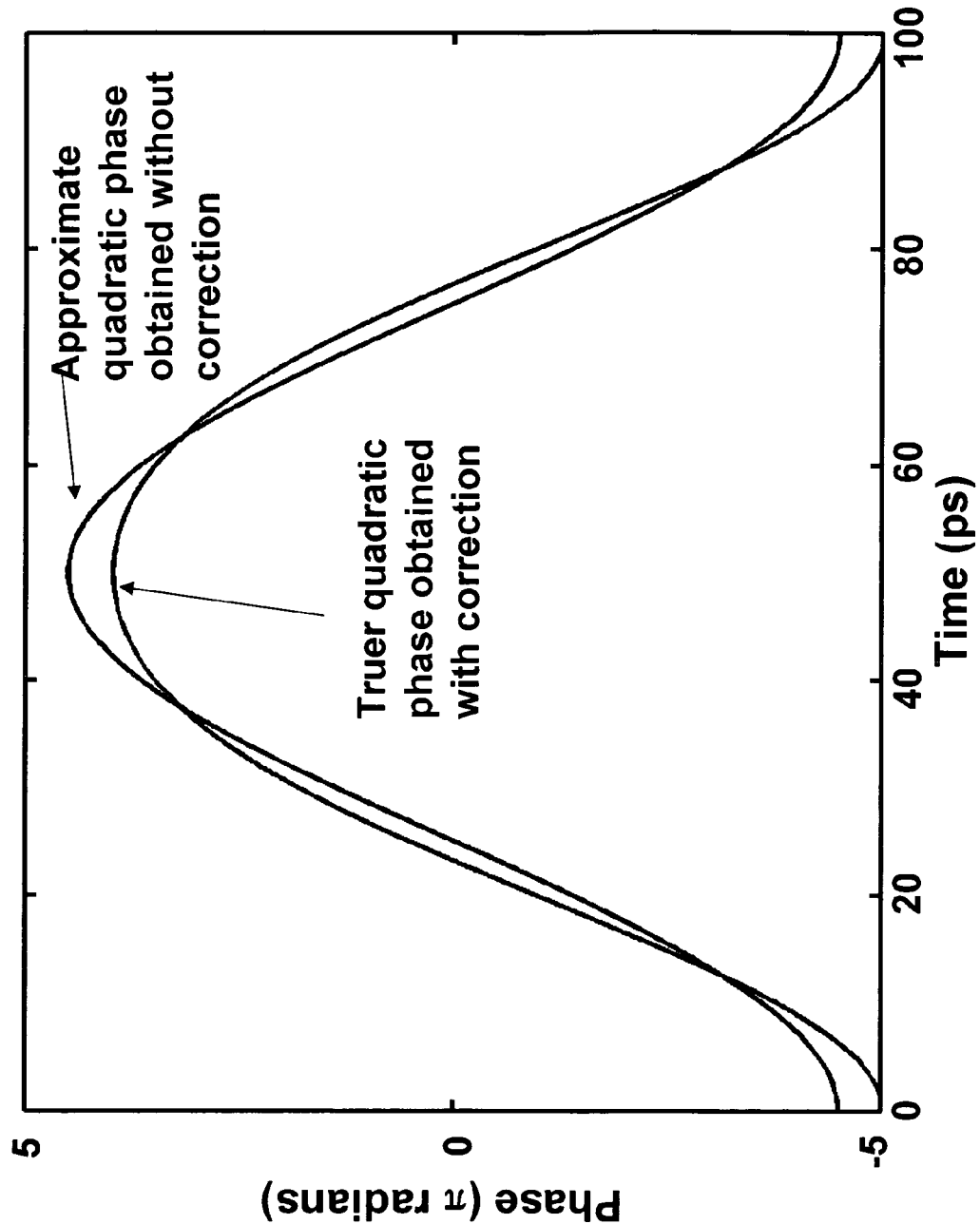
FIG. 3 is a graph illustrating the effects on the generated approximate quadratic phase waveform of the aberration correction lens used in the second preferred embodiment.

The system 100 of the second preferred embodiment eliminates aberration, without significantly sacrificing the compression ratio. Approximate quadratic phase waveforms generated by the system with and without the aberration correction are illustrated in FIG. 3. Instead of restricting the time aperture, a correction lens 26, which is analogous to aberration-correction in spatial imaging, is added to the system 100 between the time-lens 12 and the dispersion element 24. The correction lens 26 consists of another phase modulator, but this time driven at $1.0 V_\pi$ by a 20 GHz sinusoidal drive signal (twice the frequency of the time lens 12, but 11% of the drive), which is obtained by passing the drive signal for the time lens 12 through a second frequency multiplier 27 and a second variable RF delay 28.

Fourier analysis allows any periodic function to be decomposed into a sum of harmonics. The correction lens 26 essentially adds the next harmonic in the Fourier decomposition of a quadratic. Experimental results confirmed the effectiveness of the correction scheme through the suppression of the side lobes. A slightly smaller compression ratio in the aberration corrected system, 11, is explained by the additional lens acting as a weak negative lens. In helping the system 100 assimilate a truer parabolic drive, the correction lens 26 gives a chirp of sign opposite to that of the compression lens, thereby decreasing compression strength slightly. It should be noted that in the system 100, a new dispersion of 23.0 ps is used to satisfy the chirp-free condition, requiring a new frequency spacing of 680 GHz to obtain even pulse spacing. Further aberration correction can be added to the system by incorporating lenses of higher-order Fourier harmonics. The limit to the amount of correction desired is determined by the bandwidth limitations of the $LiNbO_3$ phase modulators (currently $\leq 50$ GHz for commercial devices). Although a separate correction stage is used in the system 100 of the second embodiment, it should be noted that it is possible to combine the compression and correction drive voltages into a single RF drive, and therefore use a single broadband phase modulator to obtain the same results. Thus, in other words, the time lens 12, which provides pulse compression in both embodiments, could be driven with a modified drive voltage such that the lens 12 provides both the compression and aberration correction functions.

In conclusion, the subject multi-wavelength pulse generator based on time-lens compression with optional aberration correction is all-fiber and relies on "linear" optics, allowing easy use and near-exact reproducibility and predictability. The system not only reduces the complexity of previous systems, but adds flexibility and control. The power and wavelength of the CW DFB lasers can be independently and precisely tuned for achieving the desired spectral profile and temporal spacing, and the repetition rate of the pulses can be continuously varied electronically over a large range. One can anticipate that the growing technological advances in phase modulators will extend this technique towards generating even shorter pulse widths and at higher repetition rates.

Although the invention has been disclosed in terms of preferred embodiments and variations thereon, it will be understood that other variations and modifications could be made thereto without departing from the scope of the invention as defined in the following claims.

What is claimed is:

1. A method for generating a pulse train formed from sequences of spaced pulses comprising the steps of:
   generating an optical pulse train, said optical pulse train formed from N sequences of pulses, where N is an integer greater than or equal to two, each pulse in any of said sequences having a wavelength that is the same for all pulses in the same sequence but is different from a wavelength of any pulse in any other of said sequences;
   overlaying said sequences of pulses in said optical pulse train;
   phase modulating said pulse train to form a phase modulated pulse train; and
   passing said phase modulated pulse train through a dispersion element, thereby compressing and temporally spacing said pulses from one another in said pulse train such that a repeating pattern of N evenly spaced pulses occurs in said pulse train, said pattern including one pulse from each of said N sequences.

2. The method of claim 1 wherein, before said phase modulated pulse train is passed through said dispersion element, said pulse train is further phase modulated to correct aberrations in said pulses.

3. The method of claim 2, wherein said pulse train is first phase modulated by a first modulator that driven at a first voltage and a first frequency, and is then further phase modulated by a second phase modulator that is driven at a second voltage which is lower than said first voltage, but at a, second frequency that is twice said first frequency to add a next harmonic in a Fourier decomposition of a quadratic imposed on said pulse train by said first phase modulator.

4. The method of claim 1, wherein said optical pulse train is generated by:
generating said N sequences of pulses with N laser sources, each of which generates light of a different wavelength; and
combining said N sequences of pulses in a wavelength division multiplexer to form said pulse train.

5. The method of claim 4, wherein said N lasers are independently controlled continuous wave (CW) distributed feedback (DFB) lasers, each of which has a frequency that is selected such that no spectral overlap of said N: sequences of pulses occurs after said sequences are phase modulated and then pass through said dispersion element.

6. The method of claim 4, wherein said phase modulated pulse train is passed through a dispersion element selected from the group comprising a length of standard single mode fiber (SSMF) and a fiber Bragg grating (FBG).

7. The method of claim 1, wherein said step of overlaying pulses in each of said sequences is carried out by passing said pulse train through a, pulse carver.

8. The method of claim 7, wherein said pulse carver is a Mach-Zenhder (MZ) modulator.

9. The method of claim 1, wherein said pulse train is phase modulated by passing said pulse tram thought an electro optic modulator.

10. A system for generating a pulse train having evenly-spaced compressed pulses of different wavelengths comprising:
means of generating an optical pulse train containing at least N overlaying sequences of pulses, where N is an integer treater than equal two, each of said sequences containing only pulses of a single wavelength that is different from a wavelength of any pulse in any other of said sequences;
a first phase modulator for imposing a quadratic phase on said optical pulse train; and
a dispersion element in series with said phase modulator, said phase modulator and said dispersion element acting to compress said pulses and space said pulses evenly in time from one another so that a repeating pattern of N evenly spaced pulses occurs in said pulse train, said pattern including one pulse from each of said N sequences.

11. The system of claim 10, wherein said means for generating said optical pulse train comprises:
a plurality of N laser sources, one for generating a corresponding one of each of said N pulse sequences;
a wavelength division multiplexer for N pulse sequences; and
a pulse carver for overlapping pulses from each of said N sequences in said pulse train.

12. The system of claim 11, wherein said first and second lasers are independently controlled continuous wave (CW) distributed feedback (DFB) lasers.

13. The system of claim 11, wherein each of said lasers has a frequency that is selected such that no spectral overlap of said N sequences of pulses occurs after said pulse train passes through said phase modulator and said dispersion element.

14. The system of claim 11, wherein said pulse carver is a Mach-Zenhder (MZ) modulator.

15. The system of claim 10, where said dispersion element is selected from the group comprising a standard single mode optical fiber and a fiber Bragg grating (FBG).

16. The system of claim 10, wherein said first phase modulator is an electro optic modulator.

17. The system claim 16, wherein said electro optic modulator is an $LiNbO_3$ optic modulator.

18. The s stein of claim 16, further comprising a second phase modulator disposed between said first phase modulator and said dispersion element for correcting aberrations in said pulse train.

19. The system of claim 18, wherein said first modulator driven at a first voltage and a first frequency, and said second phase modulator is driven at a second voltage which is lower than said first voltage, but at a second frequency that is twice said first frequency to add a next harmonic in a Fourier decomposition of a quadratic imposed on said pulse train by said first phase modulator.

* * * * *